US006084911A

United States Patent [19]

Ishikawa

[11] Patent Number: 6,084,911

[45] Date of Patent: Jul. 4, 2000

[54] TRANSMISSION OF CODED AND COMPRESSED VOICE AND IMAGE DATA IN FIXED BIT LENGTH DATA PACKETS

[75] Inventor: Katsuya Ishikawa, Zama, Japan

[73] Assignee: International Business Machines Corporation, Armonk, N.Y.

[21] Appl. No.: 08/803,043

[22] Filed: Feb. 19, 1997

[30] Foreign Application Priority Data

Feb. 20, 1996 [JP] Japan .................................... 8-031578

[51] Int. Cl.$^7$ ............................... H04B 1/66; H04N 7/12; H04N 7/14

[52] U.S. Cl. ............................. 375/240; 348/423; 348/17

[58] Field of Search ................................ 348/6–7, 10, 12, 348/14, 15, 16, 17, 18, 19, 423, 384, 390; 455/4.1–4.2, 5.1, 6.1–6.2

[56] References Cited

U.S. PATENT DOCUMENTS 4,710,917 12/1987 Tompkins et al. ........................ 348/15
4,847,829 7/1989 Tompkins et al. ...................... 370/260
5,410,343 4/1995 Coddington et al. ....................... 348/7
5,596,420 1/1997 Daum ...................................... 386/110
5,598,352 1/1997 Rosenau et al. ........................ 348/423
5,617,145 4/1997 Huang et al. .......................... 348/423
5,757,784 5/1998 Liebowitz et al. ...................... 370/321

*Primary Examiner*—Vu Le
*Attorney, Agent, or Firm*—Daniel E. McConnell; Martin J. McKinley

[57] ABSTRACT

A data transmission method and apparatus, by which, when coded and compressed image data are transmitted in the form of packet composed of a fixed bit length, image data can be desirably transmitted, even though a band width given to image data is dynamically changed. The data transmission method mixes coded and compressed voice data and coded and compressed image data together, and transmits resultant data to a network in the form of packet composed of a fixed bit length. As a method, the process comprises the steps of: (a) trying to input voice data; (b) detecting a presence of voice data; (c) capturing image data at a predetermined capture interval; (d) coding and compressing the captured image data at a predetermined compression rate; (e) coding and compressing the voice data upon a detection at the step (b), mixing resultant voice data with resultant image data, and dividing mixed data into packets; (f) transmitting packets; (g) predicting a presence of voice data in a near future in accordance with more than one previous result of the detection at the step (b); and (h) adjusting the predetermined capture interval at the step (c) in accordance with a prediction at the step (g).

16 Claims, 9 Drawing Sheets

Expression 4

$$Aw = \frac{1}{N} \cdot \sum_{i=O}^{N} ViWi \qquad \ldots \quad (4)$$

TRANSMISSION OF CODED AND COMPRESSED VOICE AND IMAGE DATA IN FIXED BIT LENGTH DATA PACKETS

BACKGROUND OF THE INVENTION

The present invention relates to a data transmission method for transmitting a data packet, and to an apparatus therefor; and in particular to a data transmission method for transmitting voice data and image data for video conferences in the form of packet, and to an apparatus therefor.

Personal computers (PCS) have widely appeared and have become necessities for office and home users. Accordingly, the employment of applications for the PCS have increased, and now PCS are used not only as mere OA devices but also as media for information exchange. For example, a so-called video conference system (or a television conference system) is gaining more attention: in the system, remote conferences are connected by a communication line, and voice data and image data exchanged are processed by the PCS.

For such a video conference system, ordinarily, the ISDN (Integrated Services Digital Network) is used as a communication medium and desktop PCS are employed as processors. The ISDN is a digital data transmission network that can theoretically allocate, for a single communication line, two channels each for voice transmission and data transmission. That is, the ISDN is a transmission medium that can totally handle so-called multi-media, such as text, data, still picture and motion picture, in addition to voice over a telephone. The desktop PCS are employed for video conferencing because, in addition to high popularization, it is assumed that individual conference members stay resident at specific locations in their offices.

As a result of recent, large technical developments, light and compact PCS, so-called notebook computers (PCS), have produced. Almost all the notebook PCS are battery operated, and can be carried about and used outside, i.e., can be used in a mobile environment. Thus, there has been an increased demand for the holding of video conferences in a mobile environment.

To realize a video conference in a mobile environment, the choice of what should be employed as a data transmission medium is one of the problems. While the above described ISDN provides high performance, it is expensive and is not yet popular. If the ISDN is employed, the connecting points will be very limited so that mobility is lost. On the other hand, a Plain Old Telephone System (POTS) is inexpensive and popular. The participants in a conference can, at any point where the telephone jack is provided, connect their notebook PCS to the plain old telephone system by using conventional device like modem. Therefore, a demand is increased for employing the plain old telephone system as a communication medium for video conferences.

FIG. 9 of the drawings for this disclosure is a specific diagram illustrating the arrangement of a video conference network in which the plain old telephone system and PCS are used. The PCS are connected to the plain old telephone network via their modems (M). Some PCS may be connected to an in-house telephone network via a PBX (Private Branch Exchange). It should be noted that, though not illustrated, each PC has the hardware components that are required for a video conference, such as a video camera for capturing the appearance of a user; a video capture board/controller for digitalizing input image and fetching the digital data into a computer; a microphone and a loudspeaker for inputting and outputting voices; and an audio controller for processing voice data that are to be input or output.

To implement a video conference using the plain old telephone system, the quantity of data that must be transmitted is the biggest problem. Since data for a video conference include voices and images, the total quantity of such data that must be transmitted is much greater than the band width that is possible with one telephone line, i.e., a maximum transmission rate. For video conference systems in the past that used the plain old telephone system, only simple solutions were applied: (1) transmission of voices was abandoned, or (2) dedicated lines were provided for transmission of voice data and of image data respectively. Recently, however, as data compression techniques have improved and the ability of a CPU to process voices and images have increased, voice data and image data are mixed together (or multiplexed) and the resultant data can be transferred across only a single telephone line.

Communication on a network, like telephone line, is generally performed by using packets, i.e., by dividing a string of data into packets composed of a fixed bit length. A packet consists of a data portion in which is contained the substance of the data to be transmitted, and a header portion in which is contained attribute/control information for the data to be transmitted. Usually, voice data and image data are coded and compressed before they are mixed and divided into packets.

For the transmission of voice data and image data for a video conference by using a single telephone line, priority should be given to voice data. The cutting out of voice not only makes the participants feel uncomfortable but it also disables conversation, so that real time is required more for voice than image. Thus, when voice data and image data are transmitted at the same time, a band in a packet is reserved for voice data first, and the remaining area is given to image data. It should be noted that this forcibly delays image data, because the same communication path is used in common.

FIG. 10 of the drawings of this disclosure is a diagram for an example packet structure for transmitting voice data and image data. One packet is 288 bit long. This corresponds to a quantity of data for 20 (50/1) msec when a modem with a maximum transmission rate of 14.4 kbps is used. The assignment of data fields in the packet is separated into two types, depending on whether voice data is included.

In FIG. 10(*a*) is a structure of a packet with voice data included (also called a "VOD (Voice Over Data) packet"). The first significant bit is "SYNC", that is used for synchronization. The second significant bit is a GSM bit for indicating whether or not voice data are carried in the packet. GSM is an abbreviation of Global System for Mobile communication. A voice coding algorithm in GSM is well known as a Regular Pulse Excited-Linear Predictive Coder (RPE-LPC). When the voice data are included, a voice flag (also called a "Voice Activity bit (voice input/output monitor bit)") is set (ON). A SYNC bit and the GSM bit constitute the header portion of a packet. Beginning at the third significant bit, the remaining bits is reserved for a data portion. Six bits, from the third through the eighth bit, are employed for CRC (Cyclic Redundancy Check), i.e., for the detection of transmitted data errors. 264 bits, from the ninth through the 272th bit, are assigned for voice data (Four bits starting, among 264 bits, are used as parity bits.). The voice data that are to be transmitted are coded and compressed by, for example, the GSM algorithm. The remaining 16 bits, from the 273th through the 288th bit, are assigned for image data. The image data are coded and compressed by, for example, MPEG (Motion Picture Experts Group) 1 or H261. H261 is a compression algorithm that conforms to the ITU (International Telecommunication Union) advisory. By using this packet, voice data are transmitted at the maximum transmission rate of 13 kbps (=260 bits÷20 msec).

In FIG. 10(*b*) is shown the structure of a packet (also called a "NON VOICE packet") that does not contain voice data. The first significant bit, SYNC, is used for synchronization. The second significant bit is a GSM bit indicating whether or not voice data are included in the packet. When voice data are not carried in the packet, the Voice Activity flag is reset (OFF). The SYNC bit and the GSM bit serve as the header portion of a packet. Beginning at the third significant bit, the remainder of the bits are reserved for the data portion. In this case, all the remaining band of 286 bits, from the third through the 288th bit, is given to image data. The image data are coded and compressed by MPEG1 or H261 as is described above.

For the joint transmission of multiplexed voice data and image data, a priority is given to voice data for which there is a greater real time requirement, as was previously described. Thus, the band width allocated for image data is varied, depending on whether or not voice data are present in the packet. This can be intuitively understood by referring to FIG. 10. From the fluctuation of the band width for image data in the packet, the following problems are derived.

(1) Problem related to a bit rate for coding and compressing image data

A coding and compression module (software) for image data, or for a motion picture compressor (hardware), generally adjusts a data compression rate in accordance with a provided parameter, e.g., a bit rate. More specifically, in accordance bit rate, the above software module or hardware component maintains a steady number of image frames to be coded and compressed per unit of time. Therefore, at an optimal bit rate, optimal data transmission can be performed wherein a transmission rate (band width) for image data and image quality are well balanced. However, when the band width assigned for image data is dynamically changed as is described above, the optimal bit rate is accordingly varied. If a larger bit rate is given to image data in advance with an assumption that voice data are always not present in a packet i.e., that the band width allocated for image data is wide, image quality is improved but the quantity of data for one image frame is enormous. A motion picture compression and decompressing module, or a motion picture compression and decompression device, generally handles image data by units of one frame each. If the data quantity for one frame is increased and then a longer time is required by a reception side to receive one image frame, the time for the decompression of image data and for the display of the image data is also delayed. As a result, an image that was captured several seconds before is displayed on a receiver machine.

On the other hand, if a smaller bit rate is given to image data in advance with the assumption that voice data are always present in a packet, i.e., that a band width allocated for image data is narrow, a data quantity for one image frame is reduced so that the delay of an image is resolved. However, as a tradeoff, image quality is poor even when voice data are actually not present in a packet, and thus a wide band is allocated for image data.

(2) Problem concerning a frame rate for a video capture

In order to employ PCS for a video conference, ordinarily a device, such as a video capture board or a video capture controller for digitalizing image input by a video camera and converting the resultant data into file format, is employed. Generally, the video capture controller performs the capture of image data by units of a single frame. The capture is performed in response, for example, to an image input request from upper-level hardware, i.e., a CPU that executes a video application program.

A frame rate, i.e., the number of image frames to be captured per second, is increased in order to provide motion of picture as smooth as possible. However, the total quantity of image data is accordingly increased. When a narrow band width is allocated for image data (see FIG. 10(*a*)), and when a high frame rate is used, a data delay (buffering) occurs, and an image that was captured several seconds before is displayed on a receiver machine.

On the other hand, if the frame rate is reduced too much, the delay of an image is prevented, but the smooth motion of picture can not be provided. Further, an empty packet (gap) in which video data can not be transmitted appears between the current frame and the succeeding frame, and data transmission is not efficient. Data buffering of one frame or more will induce a delay of displayed picture and is thus meaningless. It is preferable that capturing be performed at an interval wherein transmission of one frame is completed and transmission of a succeeding frame is begun. When the time required for transmitting one frame is calculated by using a data quantity for one image frame, and a band width in a communication path allocated for image data, an optimal time interval can be acquired for capturing a succeeding image frame. However, this calculation can not be applied when the band width assigned for image data is dynamically changed.

Although priority is given to voice data, it is desirable that picture be reproduced as smoothly as possible and at a constant speed. It is therefore inevitable that the problem of coding and compressing image data and of video capture must be resolved.

The above problems are not remarkable in a transmission system, such as the ISDN or the LAN, that can assign a wide band communication path for voice data and for image data. The above problems are very critical, however, in a transmission system, such as a single telephone line, wherein a single narrow band communication path is used in common by data channels.

SUMMARY OF THE INVENTION

With the foregoing in mind, it is one purpose of the present invention to provide an excellent data transmission method for transmitting data for video conferences in the form of packet, and to provide an apparatus therefor.

It is another purpose of the present invention to provide an excellent data transmission method for transmitting voice data and image data for video conferences in a multiplexed packet form, and to provide an apparatus therefor.

It is an additional purpose to provide an excellent data transmission method, whereby, when coded and compressed voice data and coded and compressed image data are multiplexed for transmission in the form of packet composed of a fixed bit length, image data can be transmitted without any delay, even though priority is given to voice data, and to provide an apparatus therefor.

It is a further purpose to provide an excellent data transmission method whereby coded and compressed image data, which are included in the form of packet composed of a fixed bit length, can be preferably transmitted, even though a band width given to image data is dynamically changed, and to provide an apparatus therefor.

To achieve the above purposes, according to a first aspect of the present invention, a data transmission method of the type which mixes coded and compressed voice data and coded and compressed image data together, and which transmits resultant data to a network in the form of packet composed of a fixed bit length, comprises a step of adjusting a compression rate for image data, depending on whether or not voice data are included in a processed packet.

According to a second aspect of the present invention, a data transmission method of the type which codes and compresses input voice data, codes and compresses captured image data, mixes and transmits resultant voice data and image data to a network in the form of packet composed of a fixed bit length, comprises a step of adjusting an interval for capturing image data, depending on whether or not voice data are included in a processed packet.

According to a third aspect of the present invention, a data transmission method of the type which mixes coded and compressed voice data and coded and compressed image data together, and which transmits resultant data to a network in the form of packet composed of a fixed bit length, comprises the steps of: (a) trying to input voice data; (b) detecting a presence of voice data; (c) capturing image data at a predetermined capture interval; (d) coding and compressing the captured image data at a predetermined compression rate; (e) coding and compressing the voice data upon a detection at the step (b), mixing resultant voice data with resultant image data, and dividing mixed data into packets; (f) transmitting packets; (g) predicting a presence of voice data in a near future in accordance with more than one previous result of the detection at the step (b); and (h) adjusting the predetermined capture interval at the step (c) in accordance with a prediction at the step (g).

At the step (c), image data can be captured either during a first relatively short capture interval or during a second relatively long capture interval. At the step (h), when the prediction indicates that voice data will be present, the second capture interval is selected, and when the prediction indicates that voice data will be absent, the first capture interval is selected.

According to a fourth aspect of the present invention, a data transmission method of the type which mixes coded and compressed voice data and coded and compressed image data together, and which transmits resultant data to a network in the form of packet composed of a fixed bit length, comprises the steps of: (a) trying to input voice data; (b) detecting a presence of voice data; (c) capturing image data at a predetermined capture interval; (d) coding and compressing the image data at a predetermined compression rate; (e) coding and compressing voice data upon a detection at the step (b), mixing resultant voice data with resultant image data, and dividing mixed data into packets; (f) transmitting packets; (g) predicting a presence of voice data in a near future in accordance with more than one previous result of the detection at the step (b); and (h) adjusting the compression rate at the step (d) in accordance with a prediction at the step (g).

At the step (d), image data can be compressed either at a first relatively high compression rate, or at a second relatively low compression rate. At the step (h), when the prediction indicates that voice data will be present, the first compression rate is selected, and when the prediction indicates that voice data will be absent, the second compression rate is selected.

According to a fifth aspect of the present invention, a data transmission apparatus of the type which mixes coded and compressed voice data and coded and compressed image data together, and which transmits the resultant data to a network in the form of packet composed of a fixed bit length, comprises: (a) voice input means for trying to input voice data; (b) voice detection means for detecting a presence of voice data; (c) image input means for inputting image data; (d) image capture means for capturing image data at a predetermined capture interval; (e) image coding and compression means for coding and compressing image data at a predetermined compression rate; (f) data mixing means for coding and compressing voice data upon a detection by the voice detection means, mixing resultant voice data with resultant image data, and dividing the mixed data into packets; (g) transmission means for transmitting packets; (h) voice prediction means for predicting a presence of voice data in a near future by employing more than one previous result of the detection by the voice detection means; and (I) adjustment means for adjusting the predetermined capture interval of the image capture means in accordance with a prediction by the voice prediction means.

The image capture means captures image data either during a first relatively short capture interval or during a second relatively long capture interval. The adjustment means selects the second capture interval when the prediction indicates that voice data will be present, and selects the first capture interval when the prediction indicates that voice data will be absent.

According to a sixth aspect of the present invention, a data transmission apparatus of the type which mixes coded and compressed voice data and coded and compressed image data together, and which transmits the resultant data to a network in the form of packet composed of a fixed bit length, comprises: (a) voice input means for trying to input voice data; (b) voice detection means for detecting a presence of voice data; (c) image input means for inputting image data; (d) image capture means for capturing image data at a predetermined capture interval; (e) image coding and compression means for coding and compressing the image data at a predetermined compression rate; (f) data mixing means for coding and compressing the voice data upon a detection by the voice detection means, mixing resultant voice data with resultant image data, and dividing the mixed data into packets; (g) transmission means for transmitting packets; (h) voice prediction means for predicting a presence of voice data in a near future in accordance with one previous result of the detection by the voice detection means; and (I) adjustment means for adjusting the predetermined compression rate of the image coding and compression means in accordance with a prediction by the voice prediction means.

The image coding and compression means captures the image data either at a first relatively high compression rate, or at a second relatively low compression rate. The adjustment means selects the first compression rate when the prediction indicates that voice data will be present, and selects the second compression rate when the prediction indicates that voice data will be absent.

In mixing voice data and image data together and dividing the mixed data into packets composed of a fixed bit length, a band width given to image data is varied greatly depending on whether or not voice data are present because the priority is given to voice data. In the examples shown in FIG. 10, the band widths given to image data are either 16 bits or 286 bits, and the difference between them is very great.

According to the data transmission method and the apparatus therefor of the present invention, in a period wherein the absence of voice data is predicted and a relatively wide band width is reserved for image data, a packet is formed by giving importance to image quality. Specifically, a compression rate for image data is lowered, or a frame rate for capturing image data is increased, to improve image quality within a permitted range.

On the other hand, in a period wherein the presence of voice data is predicted and a relatively narrow band width is given to image data, a packet is formed by giving importance to image data traffic. Specifically, a compression rate for image data is increased, or a frame rate for capturing image data is reduced, to prevent data delay (meaningless buffering of one frame or more).

According to the present invention, therefore, when coded and compressed voice data and coded and compressed image data are multiplexed into a packet having a fixed bit length, which is in turn transmitted, image data can also be transmitted without any delay, even though priority is given to voice data.

Further, according to the present invention, image data can be desirably transmitted, even though a band width assigned for image data is changed. In other words, according to the present invention, image data can be transmitted without a delay, and sequentially.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
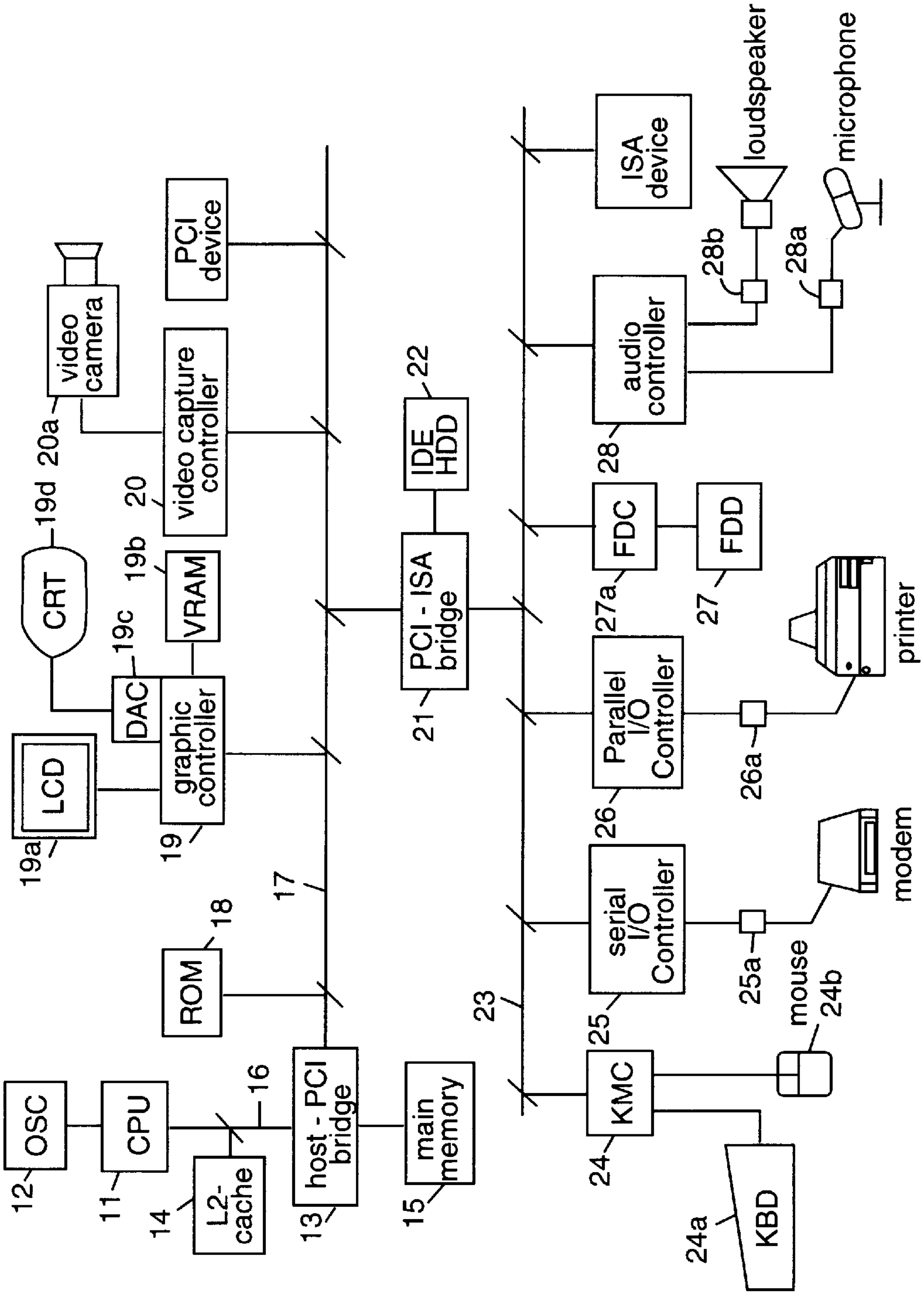
FIG. 1 is a specific diagram illustrating the hardware arrangement of a computer system 100 employed for carrying out the present invention.

FIG. 1 is a specific diagram illustrating the hardware arrangement of a computer system 100 employed for one embodiment of the present invention. The system 100 corresponds to one of the computer systems connected to the plain old telephone system. The individual system sections will now be described.

A CPU 11, a main controller, executes various programs under the control of an operating system (OS). An operating clock for the CPU 11 is supplied from an oscillator (OSC) 12. The CPU 11 can be, for example, the "PowerPC 603e-100 MHz" ("PowerPC" is a trademark of IBM Corp.) produced jointly by IBM Corp., Motorola Corp., and Apple Computer, Inc. The CPU 11 mutually communicates with individual devices across three-layer buses: a processor bus 16, which is directly connected to an external pin of the CPU 11; a PCI (Peripheral Component Interconnect) bus 17, which is a local bus; and an ISA (Industry Standard Architecture) bus 23, which is an input/output bus.

The processor bus 16 and the PCI bus 17 communicate with each other by a bridge circuit (host-PCI bridge) 13. The bridge circuit 13 in this embodiment includes a memory controller, for controlling access to a main memory 15; and a data buffer, for absorbing a gap in transfer rate between the buses 16 and 17. The main memory 15 is a write enable semiconductor memory, such as a DRAM, and is employed as a storage area for loading programs and as a work area for programs executed by the CPU 11. The memory capacity of the main memory 15 is normally several MB to several tens of MB. An L2-cache 14 is a semiconductor memory, such as an SRAM, that can be accessed at high speed and that is employed to temporarily store the minimum data required in order to absorb a gap between the processing speed of the CPU 11 and the access speed to the main memory 15. The memory capacity of the L2-cache 14 is, for example, 256 KB. A ROM 18 is a nonvolatile semiconductor memory in which a control code for the hardware operation (BIOS) and a test program at the time of activation (POST), etc., are stored permanently.

The PCI bus 17 is a standardized bus that conforms to the proposal by Intel Corp., and has, as main features, a bus width of 32 bits, an operating frequency of 33 MHZ and a maximum data transmission speed of 132 Mbps. To the PCI bus 17 are connected PCI devices, such as a graphic controller 19 and a video capture controller 20, that require relatively high speed data transmission.

The graphic controller 19 is a peripheral controller for displaying a computer image. Upon receipt of a drawing command from the CPU 11, the graphic controller 19 temporarily writes image data into a screen buffer (VRAM) 19*b*, and also reads the image data from the VRAM 19*b* and outputs it to a liquid crystal display (LCD) 19*a* that is provided as a standard feature. The graphic controller 19 also can convert the read digital image data into analog data by using an attached DA converter 19*c*, and output the resultant analog data to an external CRT (Cathode Ray Tube) display 19*d*.

The video capture controller 20 digitalizes an analog video signal input by a video camera 20*a* (or a VTR (not shown)) to convert into a file format. The video capture controller 20 is generally operated by a video capture device driver, which will be described later, and performs capturing operation by the units of a frame, i.e., a screen. The frame rate, i.e., the number of frames to be captured by the unit of time, is programmable within the range permitted by the hardware (usually, 15 to 30 frames per second). The video capture controller 20 is used also to capture image data for a video conference.

The PCI bus 17 and the ISA bus 23 mutually communicate with each other by means of a bridge circuit (PCI-ISA bridge) 21. The bridge circuit 21 in this embodiment includes a DMA controller, a programmable interrupt controller (PIC), and a programmable interval timer (PIT). The bridge circuit 21 has an IDE interface for connecting a hard disk drive (HDD) 22 (Integrated Drive Electronics: IDE is originally a standard for directly connecting an HDD to an ISA bus).

To the ISA bus 23 are connected ISA devices for which relatively low data transmission is sufficient: a keyboard/mouse controller (KMC) 24, a serial I/O controller 25, a parallel I/O controller 26, a floppy disk controller (FDC) 27*a*, and an audio controller 28.

The KMC 24 is a controller for processing a matrix input at a keyboard 24*a* and a coordinate value pointed by a mouse 24*b*.

The serial I/O controller 25 controls serial data transmission between the computer system 100 and another device, which is performed through a serial port 25*a*. A modem, for example, is connected to the serial port 25*a*. The modem modulates and demodulates signal for data communication across an analog communication system, such as a plain old telephone system. In other words, the computer system 100 uses a modem to participate in a video conference across the plain old telephone system. The maximum transmission rate of the modem is, for example, 14.4 kbps (or 28.8 kbps).

The parallel I/O controller 26 controls data transmission between the computer system 100 and another device through a parallel port 26*a*. A typical device connected to the parallel port 26*a* is a printer.

An FDD 27*a* is a controller for controlling a floppy disk drive 27.

An audio controller 28 controls audio input made via a microphone connected to an audio line-in jack 28*a*, and audio output through a loudspeaker connected to an audio line-out jack 28*b*. The audio controller 28 is hardware-manipulated by an audio device driver, which will be described later. Voice data transmission for a video conference is performed by the audio controller 28.

The computer system 100 can be a desktop PC, a notebook PC or another high-end machine. An example of the system 100 is the "IBM ThinkPad Power Series 850" ("ThinkPad" is a trademark of IBM Corp.) sold by IBM Japan Co., Ltd.

In addition to the above components in FIG. 1, many other components are required to constitute the computer system 100. Since they are well known by one having an ordinary skill in the art and are not related to the subject of the present invention, no explanation for them will be given in this specification.

Figure 2:
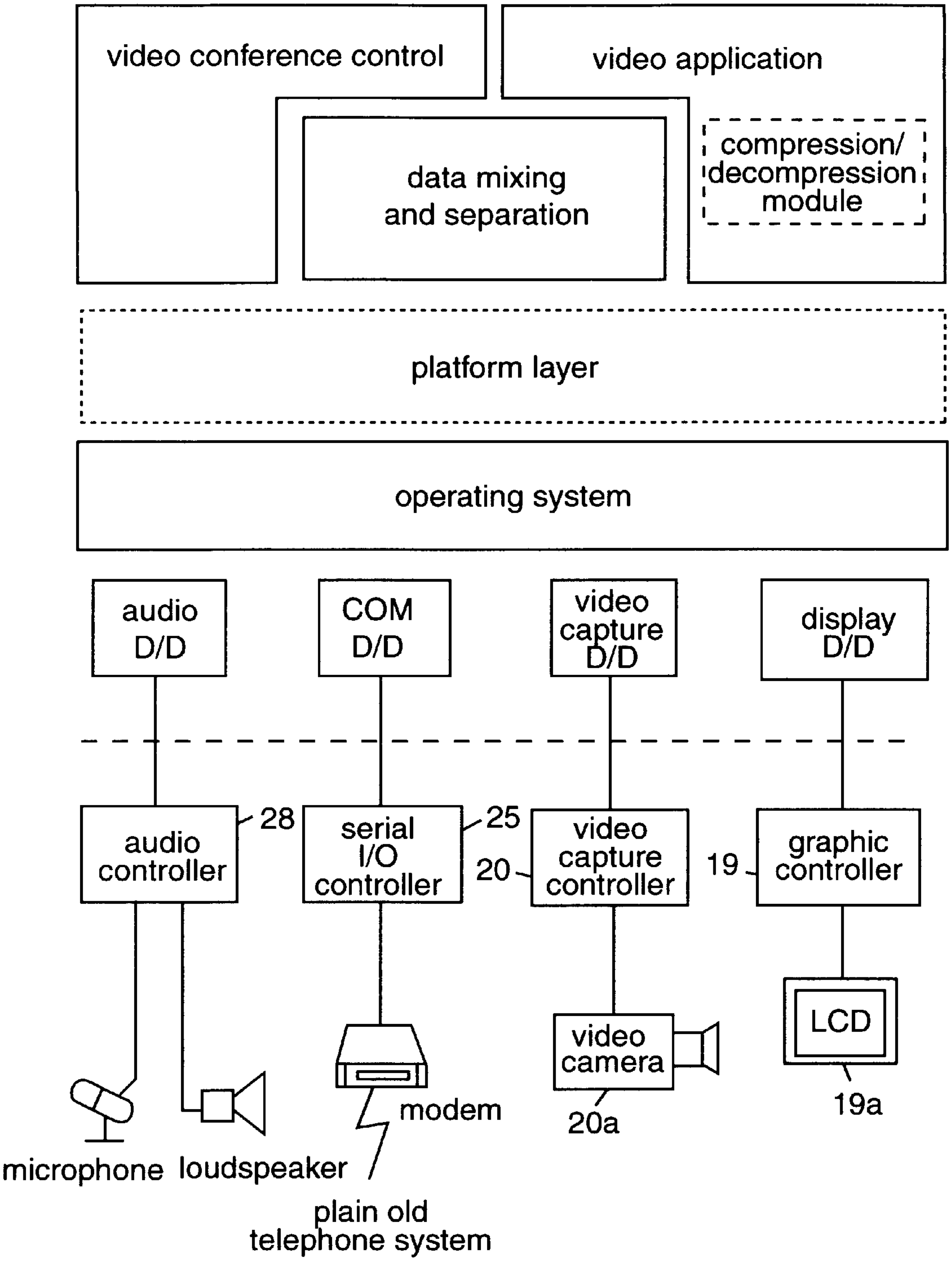
FIG. 2 is a specific diagram illustrating the arrangement of software programs executed by the computer system 100.

FIG. 2 is a specific diagram showing the correlative structure for software programs executed by the computer system 100.

The lowermost level software is a program for directly controlling hardware components, such as device drivers (D/Ds). These device drivers are, for example, a display device driver for driving the graphic controller 19; a video capture device driver for driving the video capture controller 20; a COM device driver for driving the serial I/O controller 25; and an audio device driver for driving the audio controller 28.

An operating system (OS) is basic software for totally managing all the hardware and the software of the system 100, and may be represented by OS/2 ("OS/2" is a trademark of IBM Corp.), for example. The OS includes a "file manager" for managing files stored in a memory device, such as the HDD 22; a "memory manager" for managing allocation of memory areas; a "scheduler" for managing the order of tasks that the CPU 11 will execute; and a "user interface" for handling a window display and the manipulation of a keyboard 24*a* and a mouse 24*b*.

Various application programs executed by the OS exist on the level just above the OS. The application programs are loaded as needed from an auxiliary storage device, such as the HDD 22, to the main memory 15. Application programs related to the present invention are a video conference control program, a video application program, and data mixing and separation programs. The individual application programs will be briefly explained.

A video conference control program is a software for controlling the entire conference, such as the beginning and the ending of a session (dialing and hanging up a telephone), the beginning and the ending of a video display on a display screen, the beginning and the ending of compression by a video application, and the adjustment of voice volume and microphone gain. With this program, the data exchanging rate of the modem and error messages are also displayed.

A video application program is a software that has the following functions accompanied by image data capture and packet transmission.

(1) coding and compression of an image frame fetched by the video capture controller 20.

(2) transmission of the coded and compressed image frame to a data mixing and separation program.

(3) decoding and decompression of the image frame by using the data mixing and separation program.

(4) transmission of the decoded and decompressed image frame to the graphic controller 19 so as to display it on a computer screen (it should be noted that a display device driver is employed for hardware input and output relating to the graphic controller 19).

The video application program includes an image coding/compression and decoding/decompression module for compressing and decompressing image data. The image compression/decompression module may be anything that conforms to, for example, "MPEG1".

Generally, the image compression and decompression module compresses or decompresses image data by units of a single frame. On the transmission side, image data for a succeeding frame fetched before the current frame is compressed and then buffered (The data buffering causes a data delay.). On the reception side, decoding and decompression of image data can not be performed until the image data for one frame are received. If there is an enormous amount of image data for one frame so that an extended time is required for transmission, a display process is delayed.

The image coding and compression module is so operated as to maintain a frame rate in accordance with a provided parameter, e.g., a bit rate, so as to perform compression of image frames at a constant interval. When the transmission of image data tends to be delayed, the compression rate is accordingly increased (i.e., image quality is reduced) to maintain the frame rate. When it affords to transmit image data, the compression rate is reduced (i.e., image quality is upgraded).

A data mixing and separation program is a software for producing a packet by mixing voice data and image data together, and for extracting voice data and image data from a received packet. The main functions are as follows:

(1) coding and compressing voice data input by the audio controller 28 (it should be noted that an audio device driver is used for the hardware input and output relating to the audio controller 28).

(2) mixing coded and compressed image data received from the video application program with voice data that are already coded and compressed by the data mixing separation program.

(3) dividing mixed data into packets.

(4) transmitting the packets to the serial I/O controller 25 (it should be noted that a COM device driver is used for the hardware input and output relating to the serial I/O controller 25). The packets received by the serial I/O controller 25 are transferred to a computer system on the reception side via the modem and across the plain old telephone system.

(5) receiving from the serial I/O controller 25 the packets transferred from the computer system on the reception side (it should be noted that a COM device driver is used for the hardware input and output relative to the serial I/O controller 25).

(6) extracting data from the received packets.

(7) separating the extracted data into voice data and image data (it should be noted that both the voice data and the image data are still coded and compressed).

(8) transmitting the image data to the video application program.

(9) decoding and decompressing the voice data so as to reproduce the original voice data by using the audio controller 28 (it should be noted that an audio device driver is employed for the hardware input and output relating to the audio controller 28).

(10) controlling a modem, temporarily halting and restarting the voice input and output, and monitoring the condition of a telephone system after it is connected.

Figure 10:
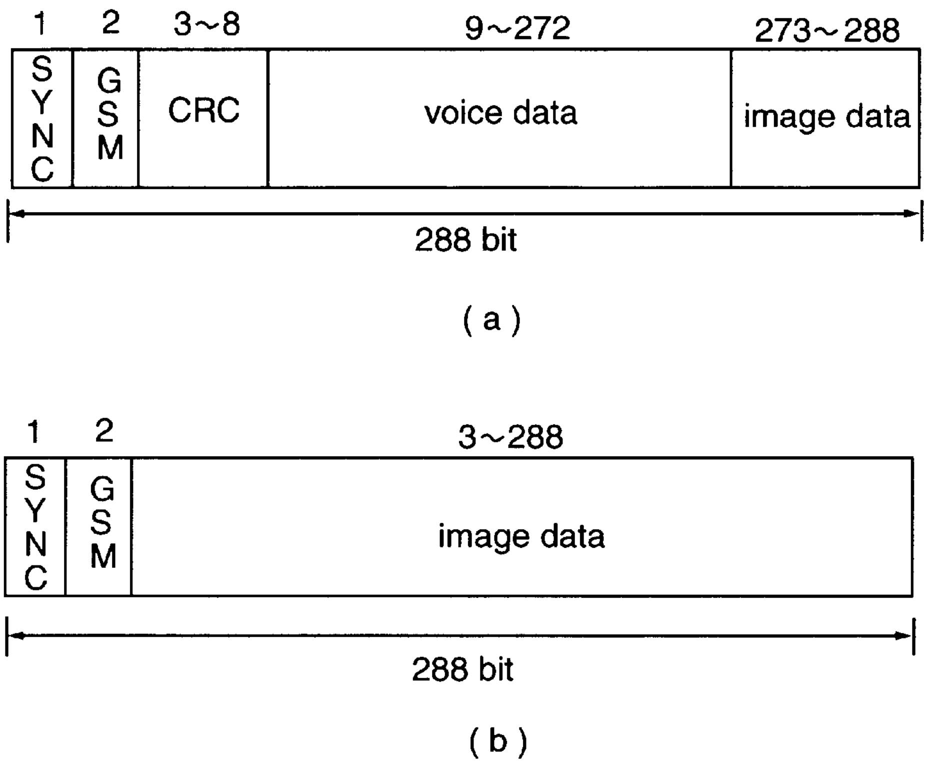
FIGS. 10(*a*) and 10(*b*) are diagrams showing packet structure examples for transmitting voice data and image data.

The data mixing and separation program also monitors whether or not voice input is currently taking place (i.e., Voice Activity). The result of the monitoring is written in a Voice Activity bit. The GSM bit of a packet is set or reset in response to the Voice Activity, and determines the structure of a packet (see FIG. 10). In this embodiment, the data mixing and separation program updates the Voice Activity bit every 20 msec. Since a library form is used for the data mixing and separation program, this program can be operated in the same processing space as another application program linked with it, and can use in common the Voice Activity bit as a shared resource. That is, the application program, e.g., the video application program, can access the Voice Activity bit without encountering any interference.

A platform layer, which is represented by a broken line, may be located between the OS layer and the application layer. The platform layer enables the sharing of software and data by computer systems mutually connected by a communication line. The platform layer can be called a "Collaboration Framework".

Figure 3:
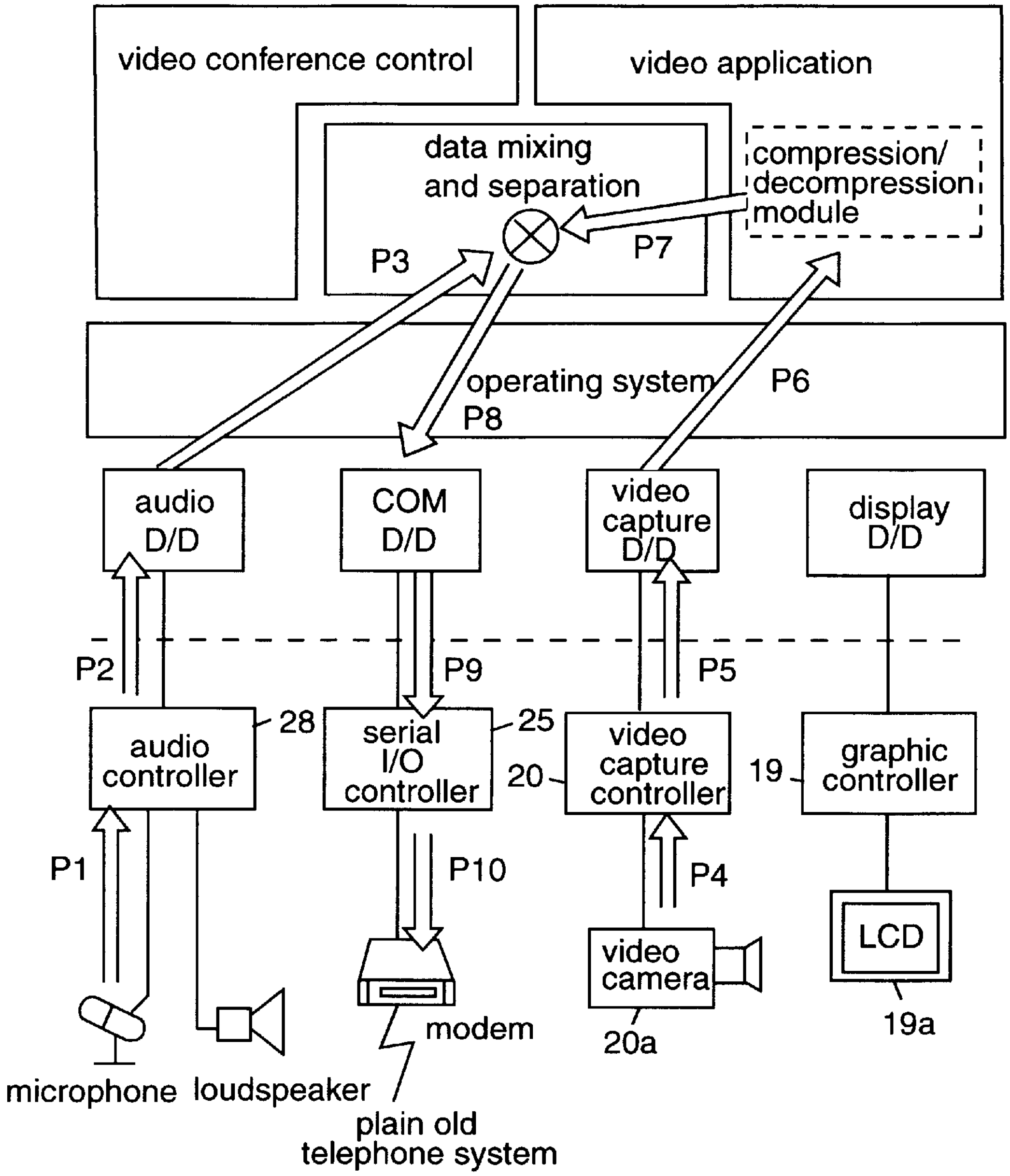
FIG. 3 is a specific diagram showing the processing whereby input voice data and image data are formed into packets and the packets are transmitted to the plain old telephone system.

FIG. 3 is a schematic diagram showing the processing by which input voice data and image data are divided into packets and the packets are transmitted to the plain old telephone system.

Voice data input at the microphone are transmitted to the data mixing and separation program by the audio device driver (indicated by arrows P1, P2 and P3). The data mixing and separation program codes and compresses the voice data according to the GSM algorithm.

An image frame taken by the video camera 20*a* is digitalized by the video capture controller 20 (indicated by arrows P4 and P5). The video application acquires image data by units of a single frame as a consequence of the input and output operation performed by the video capture device driver (indicated by arrow P6), and codes and compresses the image data according to MPEG1. When the video application captures another frame before it has coded and compressed a current frame, as the frame rate is then too high, the image data acquired for the recently captured frame are buffered so that a data delay is caused.

The data mixing and separation program receives the coded and compressed image data from the video application (indicated by arrow P7). Then, the data mixing and separation program mixes the coded and compressed voice data and the received image data together, divides the data mixture into packets composed of a fixed bit length, and transmits the packets to the COM device driver (indicated by arrow P8). At this time, responsive to the content of the Voice Activity bit, the GSM bit of the header portion is set or reset and the packet structure is defined. Priority is given to the voice data, so that a predetermined band width specified by the compression method (the 246-bit band width in this embodiment) is assigned to the voice data. The image data are contained in the remaining band (a 16-bit band when voice data are present, and a 286-bit band when voice data are absent) (see FIG. 10). When image data that have a large frame size are to be transmitted, or when voice data are continuously present, the required number of packets is increased, and the transmission of one image frame requires an extended period of time.

The packets generated by division of the mixed data are transmitted to the serial I/O controller 25 by means of the input and output operation performed by the COM device driver (indicated by arrows P9 and P10). The serial I/O controller 25 transmits the packets through the modem to the plain old telephone system.

Figure 4:
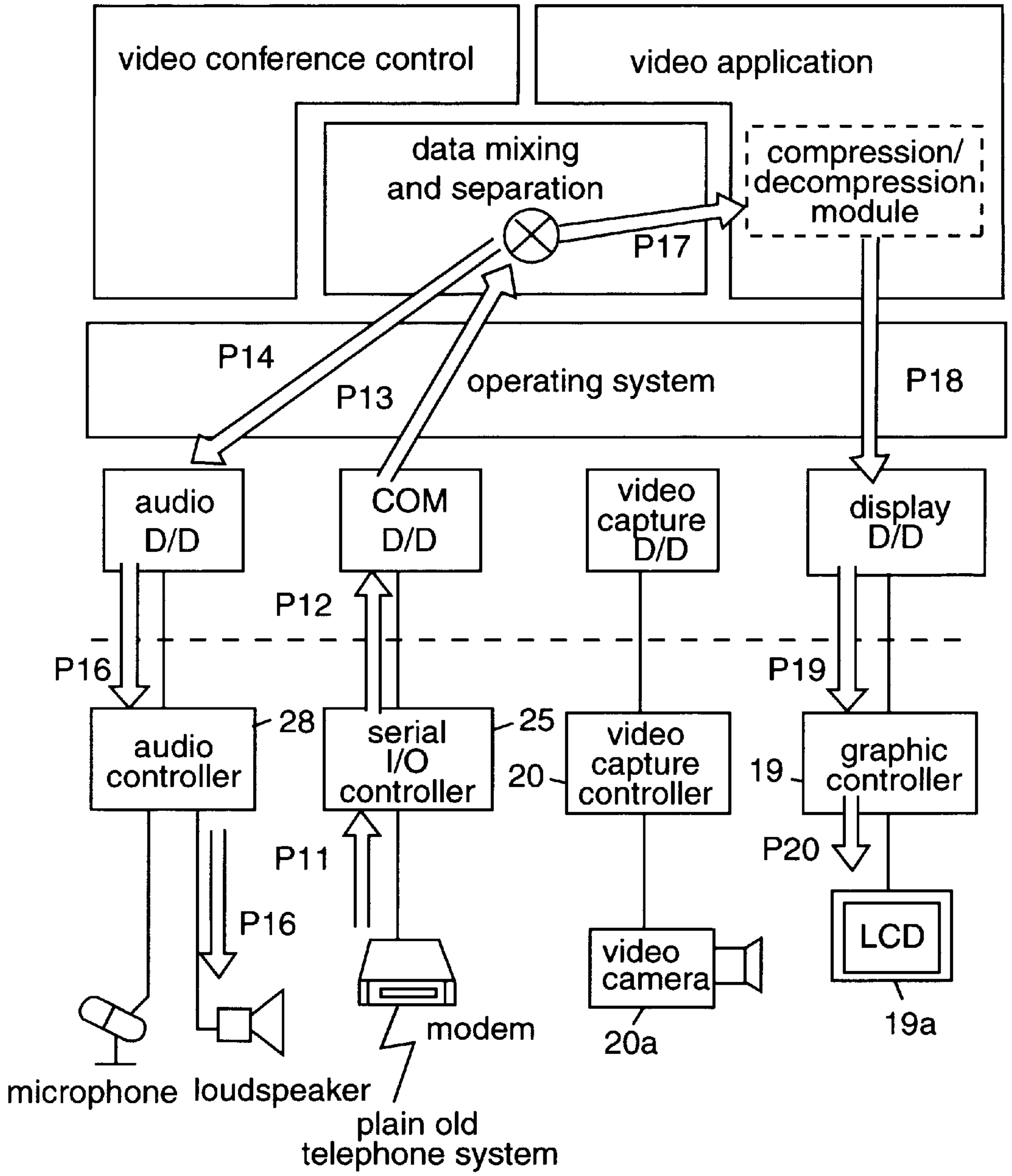
FIG. 4 is a specific diagram showing the processing whereby voice data and image data are extracted from packets that are received across the plain old telephone system.

FIG. 4 is a schematic diagram for the processing during which voice data and image data are re-assembled from a packet received across the plain old telephone system.

A packet transmitted across the plain old telephone system is received by the modem and is digitalized. The data mixing and separation program acquires the packet as a result of the input and output operation performed by the serial I/O device (indicated by arrows P11, P12 and P13).

The data mixing and separation program composes data from the packet, and separates the data into voice data and image data. The voice data are decoded and decompressed by the data mixing and separation program, and the resultant data are transmitted to the audio controller 28 (indicated by arrows P13 and P14). The audio controller 28 outputs the voice data through the loudspeaker (indicated by arrow P15).

The image data are transferred to the video application (indicated by arrow P16). The video application decodes and decompresses the image data to assemble one image data frame.

The produced image frame is transmitted to the graphic controller 19 by means of the input and output operation performed by the display device driver (indicated by arrows P17 and P18), and the image frame is displayed on the LCD screen 19*b* (arrow P19). When an extended time was required for the transmission of one image data frame because a narrow band width among a packet was given to the image data, the output of the image frame from the video application is accordingly delayed. As a result, an image displayed on the LCD 19*b* on the reception side is one that was received several seconds before.

To briefly explain the feature of the present invention, a band width in a communication path reserved for image data in the future is predicted in accordance with the presence or absence of voice data up until the current time so that the transmission of image data is optimized. The presence or absence of voice data can be determined by referring to the Voice Activity bit returned by the data mixing and separation program. Based on the history of the Voice Activity bit in a given period in the past, it can be empirically predicted whether or not there will be voice input in the near future. The prediction unconditionally prescribes a band width reserved for image data in the near future. The transmission of the image data will be optimized in accordance with the predicted band width.

In this context, the optimization of the image data transmission essentially means that data are continuously transmitted without any delay. Specific two examples for optimization processing are (1) a method for feeding voice prediction results back to a coding and compression process; and (2) a method for feeding voice prediction results back to an video capture process. According to the former method, a compression rate for image data is adjusted in accordance with a predicted band width, so that any delay in data transmission can be minimized. According to the latter method, a time interval for capturing the next image frame is set in accordance with a predicted band width, so that image frames can be supplied continuously.

Figure 5:
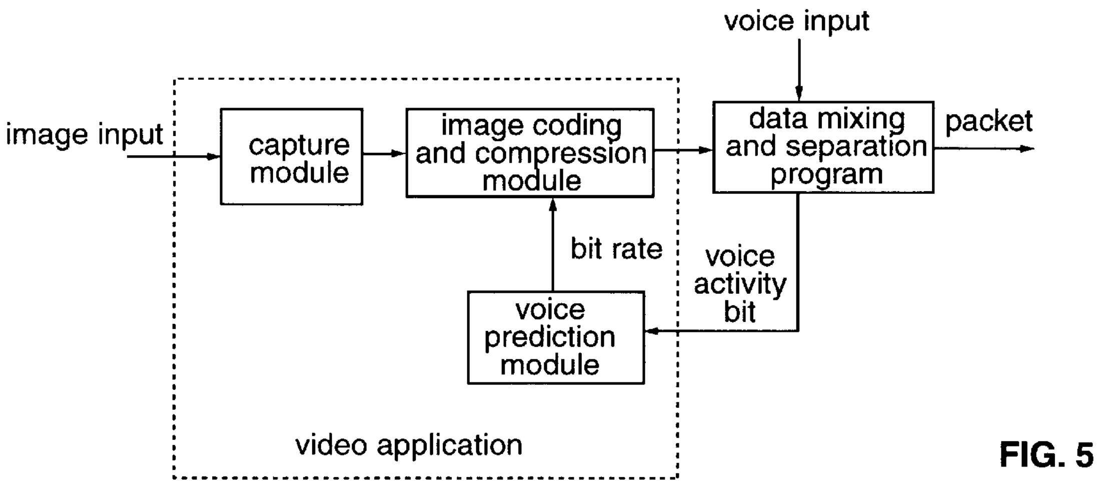
FIG. 5 is a conceptual diagram showing a method for feeding a voice prediction result back to a coding compression procedure.

FIG. 5 is a conceptual diagram for a method of feeding voice prediction results back to the coding and compression procedure.

A video application in this example includes a capture module and a voice prediction module, in addition to an image coding and compression module for coding and compressing image data by units of a single frame. The capture module requests that the video capture controller 20 supply the image data for one frame. In accordance with a voice input history acquired for a predetermined period in the past, the mechanism of the voice prediction module predicts what the voice input will be in the near future and feeds an optimal bit rate back to the image coding and compression module that react to the prediction. The operations of the individual sections will now be described with reference to the data flow.

When image data for the (N−1)th frame is received, the image coding and compression module codes and compresses the image data and transmits the resultant image data to the data mixing and separation program. The data mixing and separation program codes and compresses the voice data input at this time, mixes the voice data with the received image data, and divides the resultant data into packets. The data mixing and separation program updates, every 20 msec, the Voice Activity bit that indicates whether or not there is voice input.

The voice prediction module reads the Voice Activity bit for a predetermined time interval t [sec], and refers to the history of the Voice Activity bit for a predetermined time T [sec] (T>t), and predicts, by means of a given voice prediction algorithm (see sub-division D), what the voice input will be during the transmission of image data for the succeeding N-th frame.

Further, the voice prediction module calculates an optimal bit rate according to the prediction result, and feeds the bit rate back to the image coding and compression module. When the voice prediction is "True", i.e., when voice input is predicted, the optimal bit rate is calculated by the following Expression (1).

Expression 1

$$(\text{bit rate})=(\text{modem DCE speed})-(\text{overhead})-(\text{voice data bit rate}) \quad (1)$$

The modem DCE (Data Communication Equipment) speed is equivalent to the maximum transfer speed of the modem, and is 14.4 kbps, for example. The modem DCE speed is set by the data mixing and separation program, and is continuously employed once the modem is connected to the telephone line. The overhead is a fixed bit rate provided for the header portion of the packet (0.4 kbps in FIG. 10(*a*)). The bit rate for voice data is a fixed value given with a priority, and is 13.2 kbps (=(260+4) bits÷20 msec) when the GSM algorithm is employed (see FIG. 10(*a*)). Therefore, the bit rate to be fed back to the image coding and compression module is 0.8 kbps.

When the voice prediction is "False", i.e., when no voice input is predicted, the optimal bit rate is calculated by the following Expression (2).

Expression 2

$$(\text{bit rate})=(\text{modem DCE speed})-(\text{overhead}) \quad (2)$$

In this case, the modem DCE speed less the overhead (0.1 kbps (=2 bits÷20 msec)), i.e., 14.3 kbps, is to be fed back to the image coding and compression module.

In accordance with a newly received bit rate, the image coding and compression module codes and compresses image data for the N-th frame to maintain the frame rate. The same processing is repeated.

By means of this method, when the voice prediction is True, accordingly, a compression rate is increased (image quality is degraded); and when the prediction is False, the compression rate is reduced (image quality is upgraded). As a result, delays in the transmission of data can be minimized.

The algorithm for predicting the voice input will be described in detail hereinafter.

Figure 6:
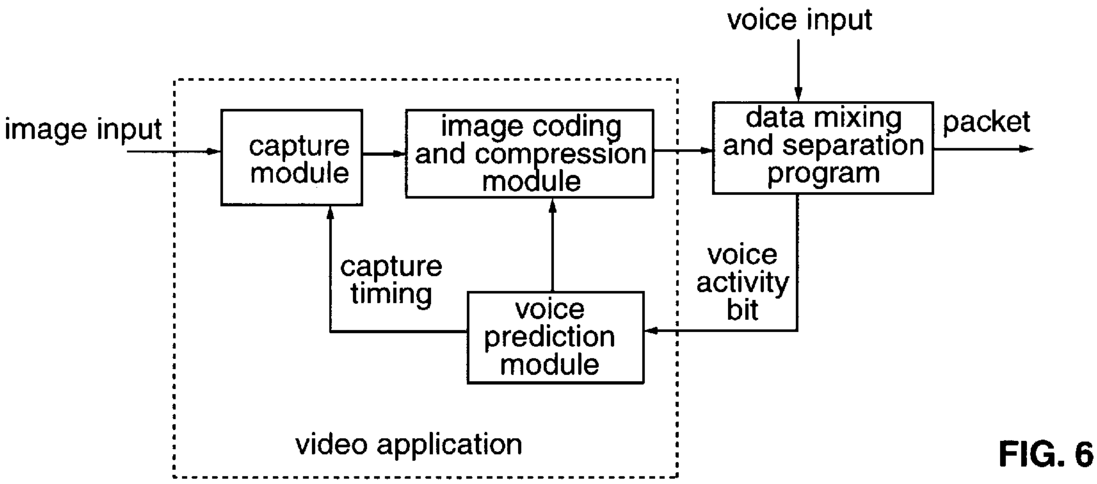
FIG. 6 is a conceptual diagram showing a method for feeding a voice prediction result back to an image capturing procedure.

FIG. 6 is a conceptual diagram for a method of feeding voice prediction results back to the image capturing procedure.

A video application in this example includes a capture module and a voice prediction module, in addition to an image coding and compression module for coding and compressing image data by units of a single frame. The capture module requests that the video capture controller 20 supply image data for one frame. In accordance with a voice input history acquired for a predetermined period in the past, the mechanism of the voice prediction module predicts what the voice input will be in the near future. Then, in accordance with the prediction results, the module feeds back to the capture module an optimal time interval during which the succeeding image frame should be fetched. The operations of the individual sections will now be described with reference to the data flow.

In response to an input request issued by the capture module, image data for the (N−1)th frame is input. The image coding and compression module codes and compresses the image data and transmits the resultant image data to the data mixing and separation program. The data mixing and separation program codes and compresses the voice data input at this time, mixes the voice data with the received image data, and divides the resultant data into packets. The data mixing and separation program updates, every 20 msec, the Voice Activity bit that indicates whether or not there is voice input.

The voice prediction module reads the Voice Activity bit for a predetermined time interval t [sec], and refers to the history of the Voice Activity bit in a predetermined time T [sec] (T>t), and predicts, by means of to a given algorithm, what the voice input will be during the transmission of image data for the succeeding N-th frame.

Based on the prediction result, the voice prediction module calculates the optimal time interval $T_c$ that extends from when it fetched the image data for the (N−1)th frame up until it fetches the N-th frame image data, and feeds the result back to the capture module. The optimal time interval $T_c$ describes a timing at which image frames can be fetched without incurring any data delay or any data acquisition gap. The time interval $T_c$ is acquired from the following Expression (3).

Expression 3

$$T_c = F_r \times 10/B + \alpha \tag{3}$$

$F_r$ denotes a frame size (byte count) of the (N−1)th frame after the image data are coded and compressed, and B denotes a band width allocated for the image data in a packet. The "10" is used as a multiplier in the first term because, for the serial transfer of data of one byte (=8 bits), a start bit and a stop bit for synchronization are added at the respective ends of the data so as to prepare data having a ten-bit length. The first term on the right side of Expression (3) corresponds to the time required for the transmission of image data of the (N−1)th frame. Constant α in the second term denotes the time required for processing after the image frame is fetched (e.g., an image coding and compression process or a data mixing process), and depends on the CPU 11.

$T_c$ seconds later, the capture module requests the input of the N-th frame image data. Hereinafter, the above process is repeated.

By employing this method, the fetching of a succeeding image frame will not be begun before the transfer of a current image frame has been completed, and thus unwanted data buffering will not be induced. Furthermore, since the fetching of as large an image frame as possible within the permissible range is attempted, the wasting of a band, in that the fetching of a succeeding image frame is not performed even though a current image frame has been transmitted, can be prevented.

As is explained elsewhere, the data transmission is optimized based on the result of a prediction for the voice input. An explanation will now be given of a voice prediction algorithm that can be applied for the voice prediction module shown in FIGS. 5 and 6.

Figure 7:
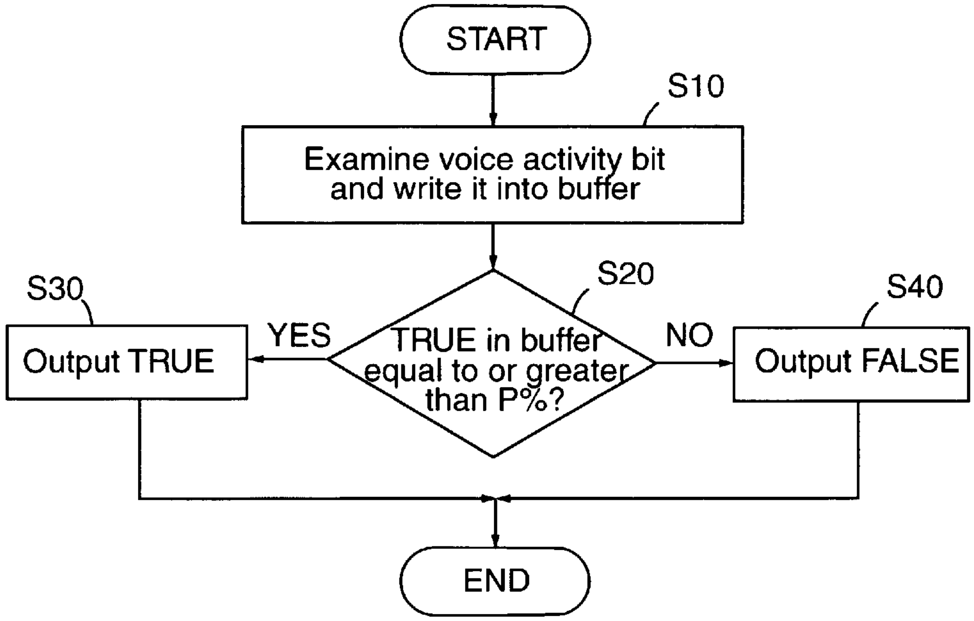
FIG. 7 is a flowchart showing a first example of a voice prediction algorithm.

FIG. 7 is a flowchart showing a first example for the voice prediction algorithm. According to the basic principle of the algorithm, the voice input in the near future is predicted based on the Voice Activity bits, during the current and previous predetermined periods, acquired by the data mixing and separation programs.

The voice prediction module, which has a timer function, refers to the Voice Activity bits every time interval t [sec], and writes its value (i.e., True or False) into its own buffer (hereafter referred to as a "voice prediction buffer") (step S10). The voice prediction buffer has a memory capacity that is large enough to hold Voice Activity bit values written for a time interval T [sec] (T>t), i.e., a plurality of the Voice Activity bit values in the past. When the buffer is full, the old data are relinquished and new data are written in.

The voice prediction module examines the history of the voice input during the latest time interval T [sec] by referring to the voice prediction buffer. In this embodiment, the ratio of True during the past time interval T [sec] is examined (step S20). When the ratio exceeds a predetermined value P [%], True is output to the image coding and compression module (or the capture module) (step S30). If the ratio is less than P [%], False is output (step S40).

Figure 8:
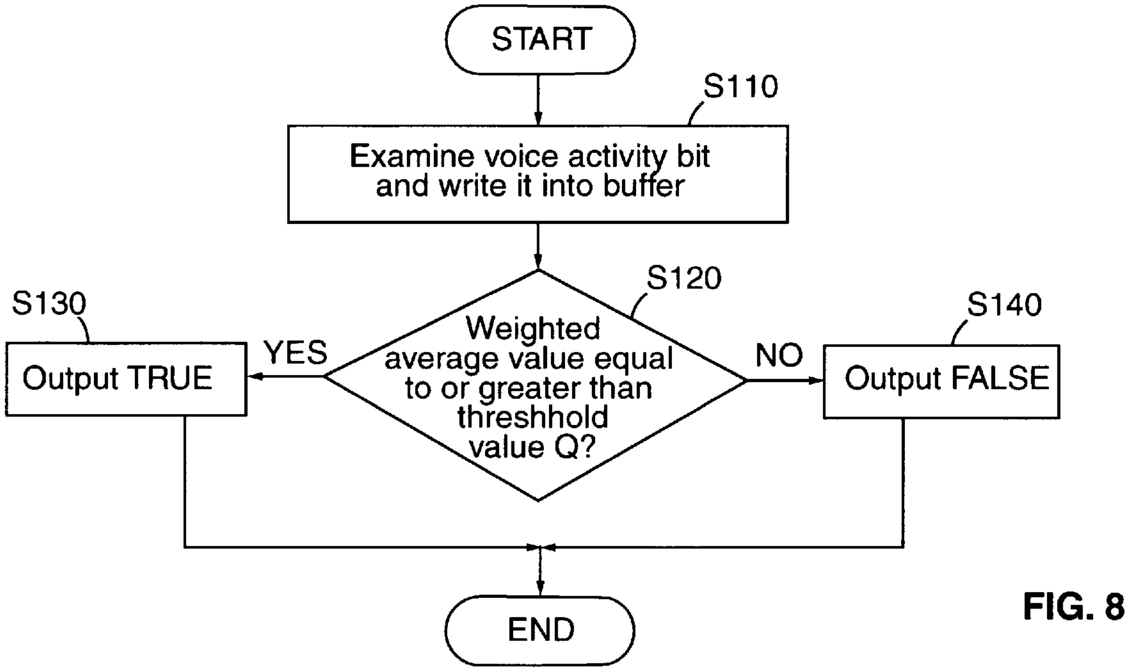
FIG. 8 is a flowchart showing a second example of a voice prediction algorithm.
Figure 9:
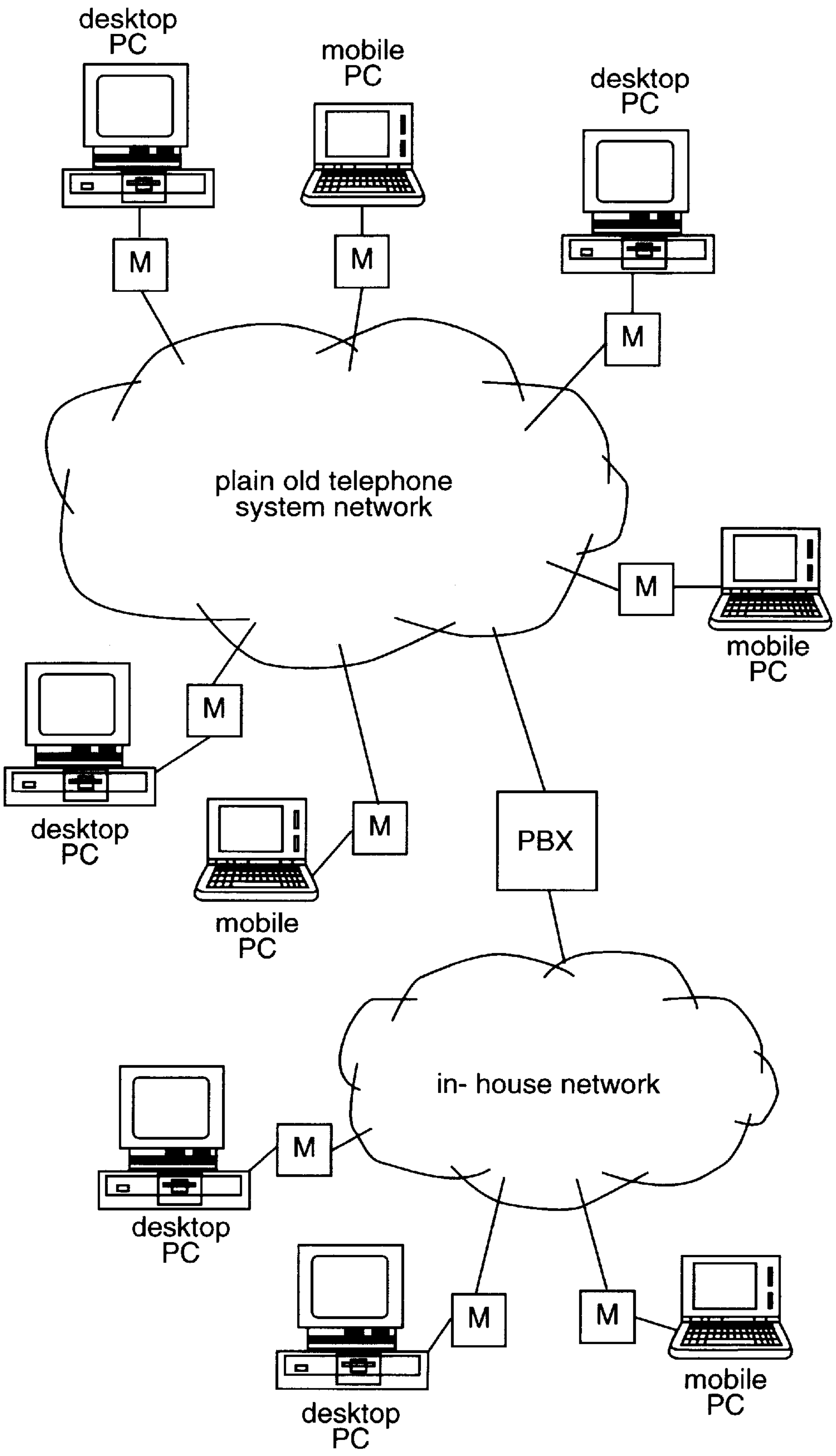
FIG. 9 is a specific diagram illustrating the network arrangement that employs the plain old telephone system and PCS.

FIG. 8 is a flowchart showing a second example for the voice prediction algorithm. According to the basic principle of this algorithm as well as that in FIG. 7, the voice input in the future is predicted by referring to the Voice Activity bits in the current and in previous predetermined periods.

The voice prediction module, which has a timer function, refers to the Voice Activity bits every time interval t [sec], and writes its value (i.e.g, True or False) into its own buffer (hereafter referred to as a "voice prediction buffer") (step S110). The voice prediction buffer has a memory capacity that is large enough to hold Voice Activity bit values written for a time interval T [sec] (T>t), i.e., a plurality of the Voice Activity bit values in the past. When the buffer is full, the old data are relinquished and new data are written in.

The voice prediction module examines the history of the voice input during the latest time interval T [sec] by referring to the voice prediction buffer. In this embodiment, weighted average value $A_w$ is calculated according to the time factor for the Voice Activity bit during the previous time interval T [sec] (step S120). The weighted average value $A_w$ is acquired by the following Expression (4).

$$Aw = \frac{1}{N} \cdot \sum_{i}^{N} ViWi$$

In the equation, the sum is taken from I=0; N denotes the number of data sets in the voice prediction buffer; and $V_i$ denotes the value of the I-th Voice Activity bit in the voice prediction buffer. When the data are True, the bit value is set to 1, and when the data are False, the value is set to 0. $W_i$ denotes a time weighting factor relative to the I-th data, and new data that are evaluated have large values.

When $A_w$ exceeds threshold value Q, True is output to the image coding and compression module (or the capture module) (step S30). When $A_w$ is smaller than the threshold value Q, False is output (step S140).

Voice prediction is retroactively derived for the predetermined time interval T [sec] from the habitual tendency of a person, once started, to continue talking for a certain period of time. The Voice Activity bit merely indicates for each 20 msec whether or not there has been voice input. Therefore, monitoring the bit during a predetermined time period T [sec] is a better way to realize exact voice prediction for a relatively long time period, a period during which one image data frame is transmitted (usually, a plurality of packets are transmitted).

According to the data transmission method and the apparatus therefor of the present invention, during a period wherein the absence of voice data is predicted and a relatively wide band width is given to image data, a packet is produced by giving importance to image quality. Specifically, a compression rate for image data is lowered, or a frame rate for capturing image data is increased, to improve image quality within a permitted range.

In the drawings and specifications there has been set forth a preferred embodiment of the invention and, although specific terms are used, the description thus given uses terminology in a generic and descriptive sense only and not for purposes of limitation.

What is claimed is:

1. A real-time audio visual data transmission method, wherein coded and compressed voice data is mixed with coded and compressed image data to form fixed bit length resultant data packets which are transmitted to a network, said method comprising the steps of:

(a) trying to input voice data;

(b) detecting a presence of voice data;

(c) capturing image data at a predetermined capture interval;

(d) coding and compressing the captured image data at a predetermined compression rate;

(e) coding and compressing said voice data upon a detection at said step (b), mixing the coded and compressed voice data with the coded and compressed image data, and dividing the resultant mixed data into fixed bit length data packets;

(f) transmitting said fixed bit length data packets to said network during a real-time audio visual presentation;

(g) predicting a presence of voice data in a near future in accordance with more than one previous result of the detection at step (b); and (h) adjusting said predetermined capture interval at said step (c) in accordance with a prediction at said step (g).

2. The data transmission method according to claim 1, wherein, said step (g) further includes the sub-steps of:

determining, for a plurality of times, whether or not a voice has been input for a predetermined period in a past;

predicting that a voice will be input in a near future when a ratio of voice input is a predetermined ratio or greater; and predicting that a voice will not be input in the near future when said ratio is less than said predetermined ratio.

3. The data transmission method according to claim 1, wherein, said step (g) further includes the sub-steps of:

determining, for a plurality of times, whether or not a voice has been input for a predetermined period in a past;

calculating a weighted average value by using a past time as an weighting factor;

predicting that a voice will be input in a near future when said weighted average value is a threshold value or greater; and predicting that a voice will not be input in the near future, when said weighted average value is less than said threshold value.

4. The data transmission method according to claim 1, wherein, at said step (c), image data can be captured either during a first relatively short capture interval, or during a second relatively long capture interval, and wherein, at said step (h) said second capture interval is selected upon a prediction that voice data will be present, and said first capture interval is selected upon a prediction indicates voice data will be absent.

5. A real-time audio visual data transmission method, wherein coded and compressed voice data is mixed with coded and compressed image data to form fixed bit length resultant data packets which are transmitted to a network, said method comprising the steps of:

(a) trying to input voice data;

(b) detecting a presence of voice data;

(c) capturing image data at a predetermined capture interval;

(d) coding and compressing the captured image data at a predetermined compression rate;

(e) coding and compressing said voice data upon a detection at said step (b), mixing the coded and compressed voice data with the coded and compressed image data, and dividing the resultant mixed data into fixed bit length data packets;

(f) transmitting said fixed bit length data packets to said network during a real-time audio visual presentation;

(g) predicting a presence of voice data in a near future in accordance with more than one previous result of the detection at step (b); and (h) adjusting said compression rate at said step (d) in accordance with a prediction at said step (g).

6. The data transmission method according to claim 5, wherein, at said step (d), image data can be compressed either at a first relatively high compression rate, or at a second relatively low compression rate, and wherein, at said step (h), said first compression rate is selected when a prediction indicates voice data will be present, and said second compression rate is selected when a prediction indicates voice data will be absent.

7. The data transmission method according to claim 5, wherein, said step (g) further includes the sub-steps of:

determining, for a plurality of times, whether or not a voice has been input for a predetermined period in a past; predicting that a voice will be input in a near future when a ratio of voice input is a predetermined ratio or greater; and predicting that a voice will not be input in the near future when said ratio is less than said predetermined ratio.

8. The data transmission method according to claim 5, wherein, said step (g) further includes the sub-steps of:

determining, for a plurality of times, whether or not a voice has been input for a predetermined period in a past;

calculating a weighted average value by using a past time as an weighting factor;

predicting that a voice will be input in a near future when said weighted average value is a threshold value or greater; and predicting that a voice will not be input in a near future when said weighted average value is less than said threshold value.

9. A data transmission apparatus which mixes coded and compressed voice data and coded and compressed image data together, and which transmits resultant data to a network in the form of packet composed of a fixed bit length, comprising:

(a) a voice input receiving voice data input;

(b) a voice detector detecting the presence of voice data;

(c) an image input receiving image data input;

(d) an image capturer capturing image data at a predetermined capture interval;

(e) an image coder/compressor coding and compressing image data at a predetermined compression rate;

(f) a data mixer coding and compressing said voice data upon a detection by said voice detector, mixing coded and compressed voice data with coded and compressed image data, and dividing resultant mixed data into fixed bit length data packets;

(g) a transmitter transmitting said fixed length data packets to said network during a real-time audio visual presentation;

(h) a voice predictor predicting a presence of voice data in a near future by employing more than one previous result of said voice detector means; and (i) an adjuster adjusting said predetermined capture interval of said image capturer in accordance with a prediction by said voice predictor.

10. The data transmission apparatus according to claim 9, wherein said image capturer can capture image data either during a first relatively short capture interval or during a second relatively long capture interval, and wherein said adjuster selects said second capture interval when a prediction indicates that voice data will be present, and selects said first capture interval when a prediction indicates that voice data will be absent.

11. The data transmission apparatus according to claim 9, wherein said voice prediction means further including:

means for determining, for a plurality of times, whether or not voice data has been input for a predetermined period in a past; and means for predicting that voice data will be input in a near future when a ratio of voice input is a predetermined ratio or greater, or predicting that voice data will not be input in the near future when said ratio is less than said predetermined ratio.

12. The data transmission apparatus according to claim 9, wherein said voice predictor further includes:

means for determining, for a plurality of times, whether or not voice data has been input for a predetermined period in a past;

means for calculating weighted average value by using a past time as an weighting factor; and predicting that voice data will be input in a near future when said weighted average value is a threshold value or greater, or predicting that voice data will not be input in the near future when said weighted average value is less than said threshold value.

13. A data transmission apparatus which mixes coded and compressed voice data and coded and compressed image data together, and which transmits the resultant data to a network in the form of packet composed of a fixed bit length, comprising:

(a) a voice input means for trying to input voice data;

(b) voice detection means for detecting the presence of voice data;

(c) image input means for inputting image data;

(d) image capture means for capturing image data at a predetermined capture interval;

(e) image coding and compression means for coding and compressing said image data at a predetermined compression rate;

(f) data mixing means for coding and compressing said voice data upon a detection by said voice detection means, mixing coded and compressed voice data with coded and compressed image data, and dividing resultant mixed data into fixed bit length data packets;

(g) transmission means for transmitting said fixed bit length data packets to said network during a real-time audio visual presentation;

(h) voice prediction means for predicting a presence of voice data in a near future in accordance with one previous result of the detection by said voice detector means; and (i) adjustment means for adjusting said predetermined compression rate of said image coding and compression means in accordance with a prediction by said voice prediction means.

14. The data transmission apparatus according to claim 13, wherein said image coding and compression means can compress said image data either at a first relatively high compression rate or at a second relatively low compression rate, and wherein said adjustment means selects said first compression rate when a prediction indicates that voice data will be present, and selects said second compression rate when a prediction indicates that voice data will be absent.

15. The data transmission apparatus according to claim 13, wherein said voice prediction means further including:

means for determining, for a plurality of times, whether or not a voice has been input for a predetermined period in a past; and means for predicting that voice data will be input in a near future when a ratio of voice input is a predetermined ratio or greater, or predicting that a voice will not be input in a near future when said ratio is less than said predetermined ratio.

16. The data transmission apparatus according to claim 13, wherein said voice prediction means further including:

means for determining, for a plurality of times, whether or not a voice has been input for a predetermined period in a past;

means for calculating a weighted average value by using a past time as a weighting factor; and means for predicting that voice data will be input in a near future when said weighted average value is a threshold value or greater, or predicting that voice data will not be input in the near future when said weighted average value is less than said threshold value.

* * * * *